United States Patent [19]

Duncan, Sr.

[11] 4,084,851
[45] Apr. 18, 1978

[54] DETACHABLE, SELF-DUMPING, SELF-RETRACTING CARGO BIN FOR PICKUP TRUCKS

[76] Inventor: William W. Duncan, Sr., 4771 E. Live Oak, Lodi, Calif. 95240

[21] Appl. No.: 772,088

[22] Filed: Feb. 25, 1977

[51] Int. Cl.² .............................................. B60P 1/30
[52] U.S. Cl. .................................... 298/14; 298/1 R; 298/1 A
[58] Field of Search ................. 298/1 R, 1 A, 12, 13, 298/14, 15, 17.5, 20 R, 38; 296/28 D; 214/501

[56] References Cited

U.S. PATENT DOCUMENTS

| 3,147,999 | 9/1964 | Daniels | 298/15 |
| 3,630,571 | 12/1971 | Saldana | 298/1 A X |
| 3,826,534 | 7/1974 | Ruff | 298/1 A |
| 3,915,496 | 10/1975 | Mabry, Jr. | 298/1 A X |

FOREIGN PATENT DOCUMENTS 113,667  3/1918  Canada ................................ 298/14

*Primary Examiner*—Frank E. Werner
*Attorney, Agent, or Firm*—Sellers and Brace

[57] ABSTRACT

A self-dumping self-retracting cargo bin adapted for installation in a conventional pickup truck without need for tools or alteration of the truck. The bin has front and rear roller means for supporting the bin on a loading dock or the like when not in a truck. When mounted in a truck, the rear end of the bin is supported on fulcrum rollers carried by a latching sub-assembly extending crosswise of the truck body with latch means positively embracing the truck's rear stake sockets. The bin is self-dumping when its rear doors are unlocked and it is released from its travel mode merely by starting the truck forward abruptly. Energy stored in heavy duty retraction springs during the dumping cycle is effective to restore the bin toward its travel mode.

12 Claims, 5 Drawing Figures

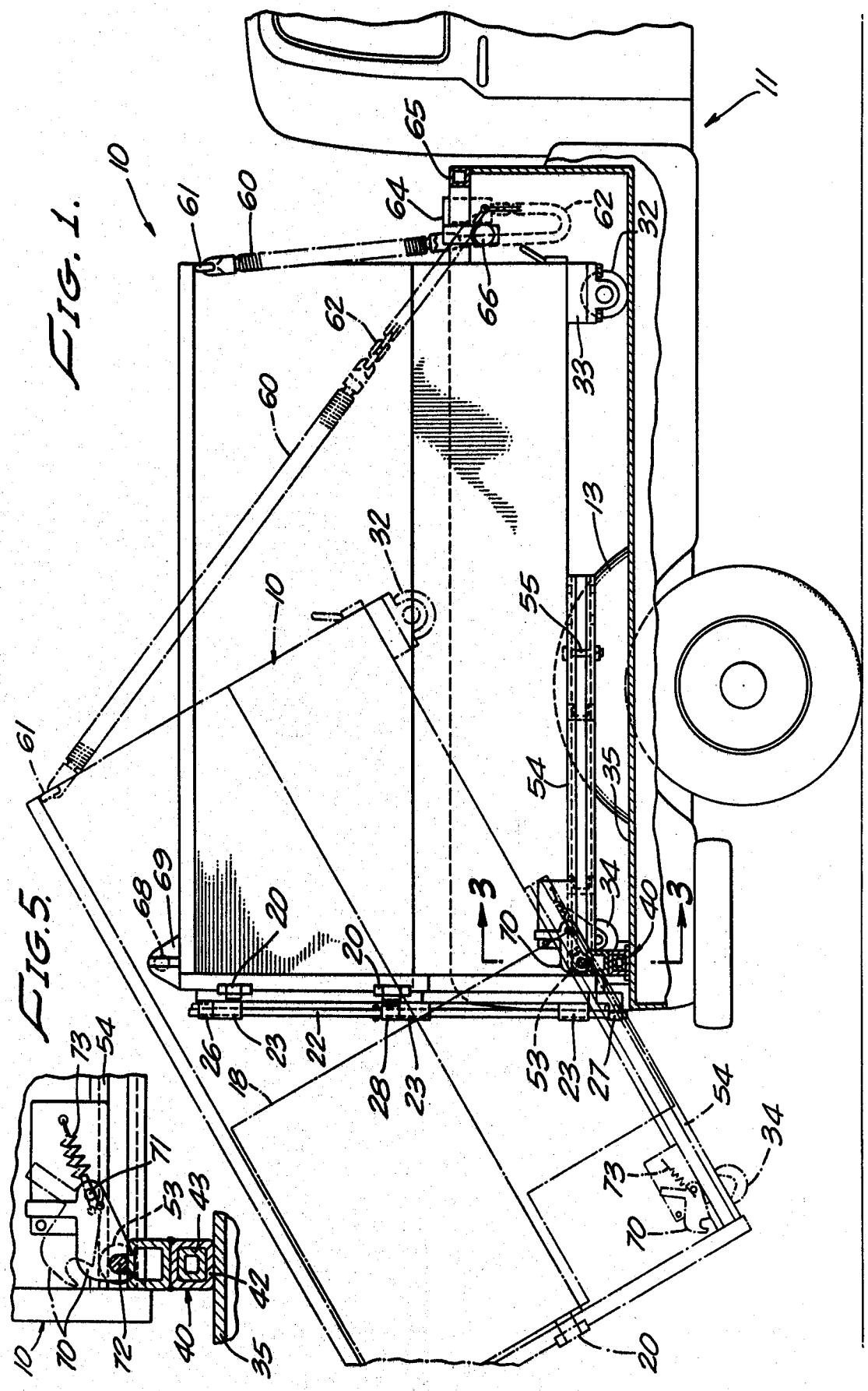

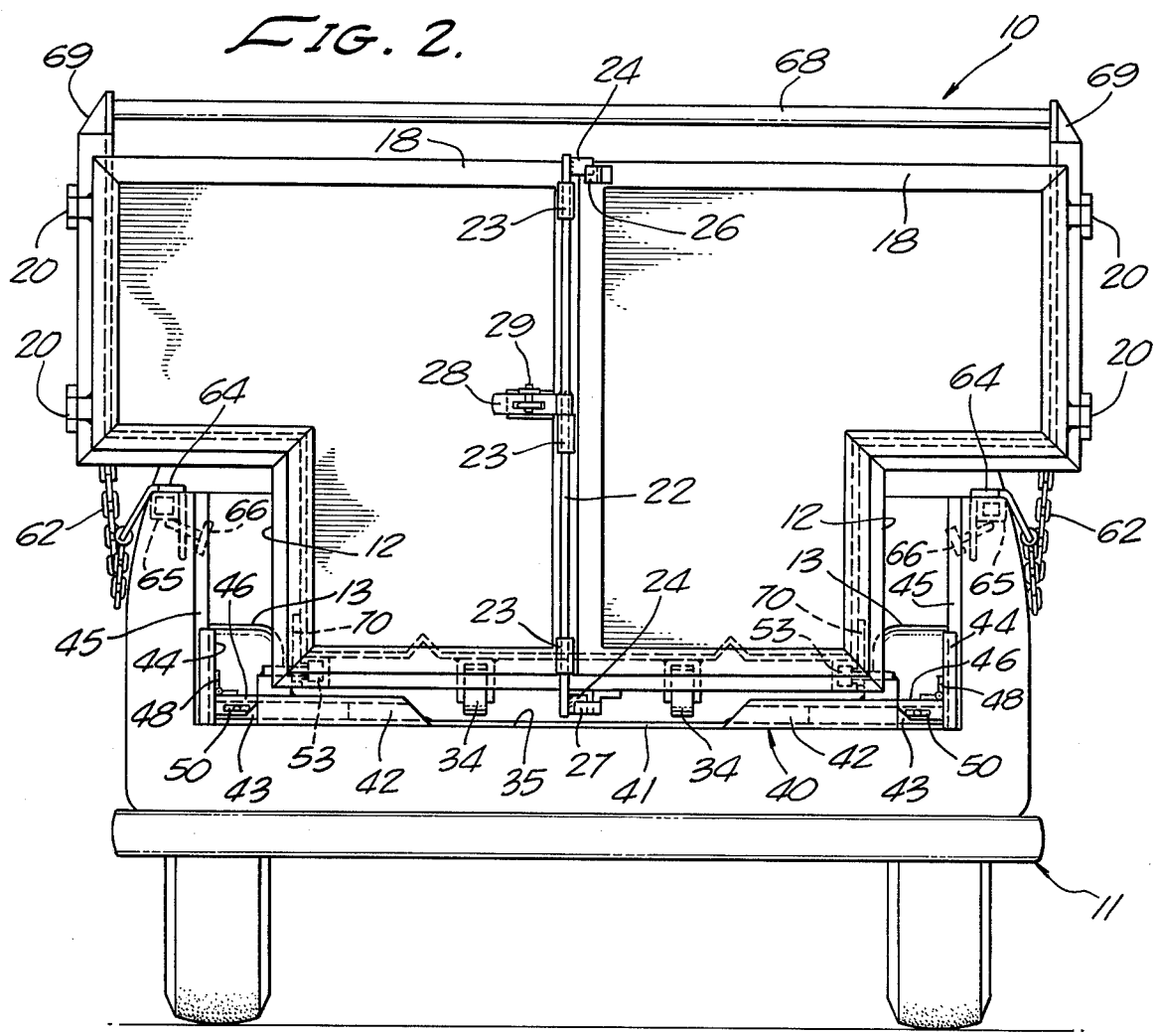
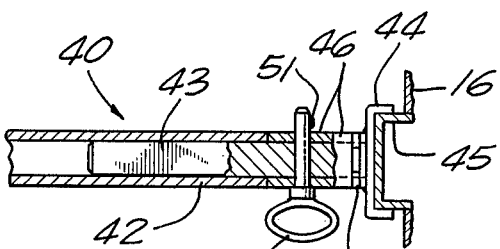
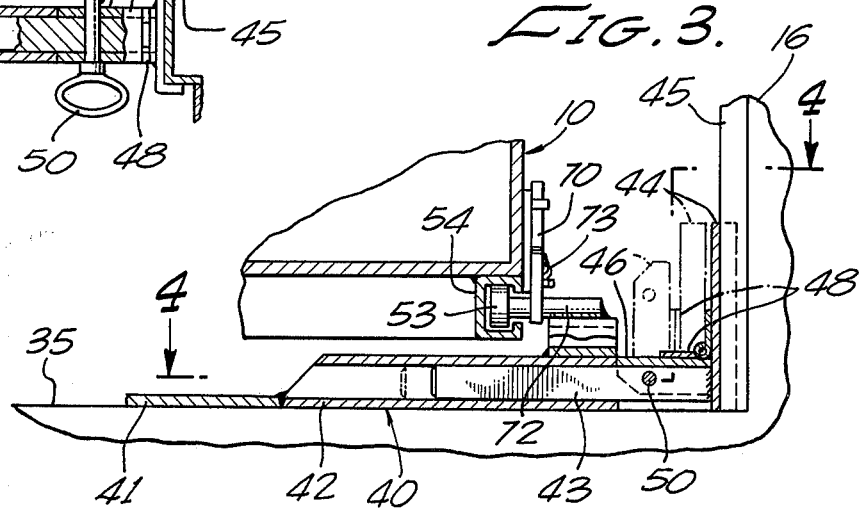

DETACHABLE, SELF-DUMPING, SELF-RETRACTING CARGO BIN FOR PICKUP TRUCKS

This invention relates to a bin for bulk cargo, such as trash, and comprises a unique construction readily installable in a highly reliable fool-proof manner in a pickup truck without need for tools or alterations in the truck.

BACKGROUND OF THE INVENTION

Various proposals have been made heretofore to provide a dumping accessory for lighter cargo mountable in the bed of a pickup truck and removable therefrom when not needed. Exemplars of such constructions are disclosed in United States patents to Klingebiel U.S. Pat. No. 2,529,558; Kirkwood U.S. Pat. No. 3,055,709; Daniels U.S. Pat. No. 3,147,999; King U.S. Pat. No. 3,446,534; and Saldana U.S. Pat. No. 3,630,571.

Most of these prior proposals necessitate alterations in the truck and that certain hardware and other fixtures be secured to the truck by welding, bolts, rivets or the like. This not only adds substantially to the cost but requires the services and tools of a mechanic and interferes objectionably with other modes of utilizing the truck. Kirkwood and Daniels avoid the need for making alterations in the truck but have other undesirable shortcomings. For example, Kirkwood requires an extensive subframe overlying the complete bottom of the usual truck cargo space and provided with a multiplicity of bin-supporting rollers. For this reason, the bin itself lacks roller mobility when not mounted in a truck. Daniels requires tools to wrench the set screws provided to secure his subframe frictionally clamped between the sidewalls of the cargo compartment. This is an unreliable and unsatisfactory mode of securing the cargo bin in a truck. In consequence the bin is likely to become detached from the truck during a dumping operation and partially filled with trash. Saldana is the only prior art known to this applicant proposing means intended to retrieve cargo space as an incident to a dumping operation. However, the means provided by him for this objective are improperly designed, inadequate and reliable.

THE INVENTION

The foregoing and other shortcomings of the prior art are avoided by this invention which provides a completely self-contained, self-dumping, self-retracting trash bin readily installed in a pickup truck without need for tools or truck alterations. The bin is T-shaped in cross-section with the lower half sized to fit readily between the rear wheel wells and the top half projecting outwardly over the sidewalls of the truck cargo space. The bin is positively locked in the cargo space by a latching subassembly having its ends shaped to embrace the stake sockets at the rear ends of the truck. This subassembly also supports fulcruming rollers extending into guide channels fixed to the lower lateral corners of the bin and cooperating therewith to limit rearward movement of the bin as well as providing a fulcrum therefor during a dumping cucle.

A pair of long, strong retraction springs have their upper ends fixed to the upper forward corners of the bin and their lower ends secured to the truck body forwardly of the fully retracted bin. These springs start storing energy soon after the start of a dumping cycle which is preferably initiated by abrupt forward movement of the truck at a dump site. The momentum this imparts to the bin, together with the weight of its unbalanced weight and the weight of its contents, serves to store ample energy in the springs to enable them to return the bin substantially to its normal travel position, the remaining movement if any, being easily accomplished manually.

Accordingly, it is a primary object of this invention to provide an improved, self-dumping, self-retracting cargo bin for demountable installation in a pickup truck without need for tools or alterations in the truck.

Another object of the invention is the provision of an improved self-dumping trash bin for temporary use in pickup trucks of T-shape in cross-section with the T-stem portion slidably receivable between the rear wheel wells and the upper, or T-head portion, overlying the sidewalls of the truck cargo space.

Another object of the invention is the provision of a self-dumping, self-retracting trash bin provided with an improved self-latching subassembly equipped with fulcruming rollers for the bin and with positive latching devices on its ends sized to embrace a pair of truck stake sockets.

Another object of the invention is the provision of a self-dumping trash bin rollingly and pivotally supportable in a pickup truck and equipped with rollers at its opposite ends for convenience in moving the bin about a loading dock or other floor when not mounted in a truck.

These and other more specific objects will appear upon reading the following specification and claims and upon considering in connection therewith the attached drawing to which they relate.

Referring now to the drawing in which a preferred embodiment of the invention is illustrated:

FIG. 1 is a fragmentary view, partly in section, of a pickup truck showing a preferred embodiment of the bin in its travel mode and including a dotted line indication of the position of the bin while in its dumping position;

FIG. 2 is a rear end view of FIG. 1;

FIG. 3 is a fragmentary view on an enlarged scale taken along lines 3—3 on FIG. 1; the full line showing of the latch indicating its normal installed position and the dotted line showing of this latch indicating the position of the parts in the unlatched position thereof; and FIG. 4 is a cross-sectional view taken along the broken line 4—4 on FIG. 3.

Referring initially more particularly to FIGS. 1 and 2, there is shown a preferred embodiment of the invention self-dumping bin, designated generally 10, mounted in a conventional pickup truck 11. For clarity, the tailgate of that vehicle has been omitted but it will be understood this gate is normally present and latched in closed position by well known means when the bin is mounted in the truck.

As best appears from FIG. 2, bin 10 is preferably of T-shape as viewed from either end, the lower half or T-stem portion 12 having a width receivable freely between the sides of the rear wheel wells 13 of the truck. The top half, or T-head portion of the bin, is very substantially wider and projects outwardly in overlying relation with the upper edges of the sidewalls of the truck cargo space. The bin is closed at its forward end and has L-shaped doors 18,18 normally closing its rear end and hinged to the opposite ends of the T-head portion by hinges 20. These doors are held closed by a latch extending vertically of the adjacent edges of doors 18.

This latch includes an operating rod 22 journalled in lugs 23 secured to one of the doors and having tangs 24 at its ends engageable with lugs 26, 27, one of which is welded to the top of the right hand gate and the other of which is welded to the bottom of the bin. A hasp 28 welded to rod 22 is securable in its locking position by a keeper pin 29.

Bin 10 is preferably provided crosswise of its front end with a long supporting roller 32 journalled at its ends in brackets 33 secured to the bottom of the bin. A second set of rollers 34 spaced inwardly from the lateral sidewalls of the bin for a purpose which will become apparent presently. As appears more clearly from FIG. 1, rollers 34 are spaced somewhat above and out of contact with floor 35 of the truck cargo space so long as the bin mounted is mounted in a truck. However, when demounted from the truck these rollers cooperate with roller 32 to facilitate mobility of the bin on a loading dock or supporting surface other than the bed of a truck.

While mounted in the truck, the rear end of bin 10 is supported on a latching and bin fulcrum subassembly 40 extending crosswise of the interior rear end of the truck cargo space. This subassembly includes a strong metal strip 41 (FIG. 3) lying flush against the bottom 35 of the cargo space and having its opposite ends welded to one end of a square tubular housing 42, slidably supporting a square rod 43 therein.

A channel-shaped member 44 welded in an upright position to the outer end of rod 43 is sized to snugly embrace the juxtaposed portion of the truck stake socket 45 which socket forms a standard part of the truck sidewall 16. Any suitable means may be employed to hold rod 43 and channel member 44 positively locked in this position to embrace the adjacent one of stake sockets 45, the means herein shown by way of example comprising a short length of a channel-shaped member 46 pivoted to latch member 44 by a hinge 48. Member 46 embraces the upper portion of rod 43 and is held positively in locking position by a latch pin 50 insertable through aligned openings in the side flanges of member 46 and rod 43. A spring-seated ball detent 51 near the free end of pin 50 (FIG. 4) serves to hold the pin against unintended displacement from its assembled position. So long as the pin extends through the aligned openings in members 43 and 46 the latching assembly 40 is held positively locked crosswise of the rear end of the truck cargo space. However, when the pins 50 are withdrawn, the associated one of members 46 can be hinged to its upright position as is indicated in dot and dash line in FIG. 3 thereby permitting rod 43 and member 44 to be retracted inwardly away from stake sockets 45.

The latching subassembly 40 also supports a pair of ball bearing fulcruming rollers which are insertable into the front ends of channel-shaped guideways 54 secured along the rear lower corners of bin 10 as is best shown in FIGS. 1 and 3. Guideways 54 have a length at least one half the length of bin 10 and their forward ends are normally closed by a bolt 55 insertable in a selected set of a plurality of sets of holes spaced apart lengthwise of the forward ends of the guideways 54. These bolts act to engage axles 72 and limit the rearward movement of the bin during a dumping operation as will be explained presently. The rear ends of guideways 54 are closed and cooperate with bolts 55 and roller 53 in retaining the latching sub-assembly 40 assembled to bin 10. After latching members 44 are locked in engagement with stake sockets 45, bin 10 may be rolled to and fro in the truck to the limit permitted by the engagement of bolts 55 at the forward ends of guideways 54 with the axles 72 supporting the fulcrum rollers 53. So long as bolts 55 are secured in place, subassembly 40 is retained assembled to bin 10. The extreme rearward or dumping position of the bin is indicated in dot and dash lines in FIG. 1 and at this time the bin pivots clockwise about the fulcrum provided by rollers 53 so as to dump its contents.

An important feature of the invention is the provision of self-retracting means for the bin operable to retrieve the bin back into the truck and substantially to its fully forward position as the last of its contents are gravitating from its rear end. This retrieval means comprises a pair of powerful coil springs 60 having the upper end of each pivotally connected to the upper forward corner of the bin by eye bolts 61. A link chain 62 connects the lower ends of each spring to a suitable anchorage with a portion of the truck forward of the front end of the bin in its fully retracted position. This anchorage means herein shown comprises a U-shaped clamping bracket 64 embracing the top rim 65 of the cargo box. Clamp 64 is held anchored to rim 65 by a thumb screw or the like 66.

The upper rear ends of the bin are held rigidly parallel to one another by a spacer rod 68 having its opposite ends connected to the rear corners of the bin by brackets 69 (FIG. 2).

In use, the bin is rolled from a loading dock into the rear of a pickup truck following which the latching assembly 40 is positioned opposite a rear pair of stack sockets 45. During this maneuver the latching members 44 are in their retracted position and locking members 46 are hinged to the dot-and-dash line upright position shown in FIG. 3. When the latching assembly is properly positioned with latch member 44 directly opposite a respective one of the truck stake sockets 45, members 43 and latching members 44 are extended into firm embracing relationship with the stake socket 45 whereupon the locking member 46 is pivoted to its horizontal closed position and latch pin 50 is inserted until ball detent 51 (FIG. 4) protrudes from the sidewall of the pin to lock it against unintended displacement.

A final installation operation comprises securing the clamp assembly 64 for the forward lower end of springs 60 to the rim of the cargo compartment as close to its forward end as is feasible, thumb screws 66 being tightened on each of the clamps.

After the bin is filled with material the truck proceeds to a public dump or other unloading place. The latch pin 29 for doors 18,18 is removed and the doors are swung open flush with the adjacent side of bin 10, it being noted from FIG. 2 that the upper portion of the bin projects substantially beyond the sidewalls of the truck. In consequence these doors in no wise interfere with the dumping operation. The truck operator then returns to the driver's seat and starts the truck forward abruptly thereby causing the bin to roll freely forwardly on front roller means 32 and the two fulcrum rollers 53. This movement continues until interrupted by the contact of the closed rear end 55 of guideways 54 with the shaft supporting rollers 53. During the final phase of this movement, the bin pivots about the fulcrum rollers and stores additional energy in the retrieval springs 60,60. The contents of the bin are quickly discharged as the energy stored in the springs pivot the bin back onto the bed of the truck and rolls it forwardly substantially to its initial position as shown in FIG. 1. If necessary, the bin is pushed any remaining distance required to return it to its original position. The locking dog 70 pivoted to bin 10 by pin 71 then engages over the top of axle 72 supporting fulcrum roller 53. Dog 70 is held firmly in this locking position by spring 73 until manually released to its unlocked position by the operator before starting the truck forward abruptly at the beginning of the dumping described above. It will be understood that the driver may assist the bin retrieval by initiating an abrupt rearward movement of the truck immediately as the last of the load is sliding out of the rear of the bin, thereby aiding the springs in recovery of the bin.

It will be understood that bin 10 may be supported on camper-type jacks of a well known type when not in a pickup truck. Four such jacks would be used and attached to an outer corner of the bin. Owing to the fact the bin is somewhat wider than a conventional pickup truck, these jacks may be attached to the bin and used to elevate the bin from the truck bed following which the truck is driven forwardly away from the bin until the bin is needed to haul trash.

While the self-dumping self-retracting cargo bin for pickup trucks herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A self-dumping cargo bin adapted to be demountably installed in the cargo space of a conventional pickup truck without need for tools or alterations in the truck, comprising:
    a cargo bin equipped with first and second roller means adjacent the front and rear ends thereof and sized for rolling movement lengthwise of the bin on a supporting surface lengthwise of the cargo space of a conventional pickup truck,
    a pair of channel-shaped roller guideway means attached to and extending lengthwise and adjacent the rear lower portion of said bin,
    a bin latching sub-assembly having bin support and fulcrum rollers secured thereto and which rollers are insertable through one end of said roller guideway means, and
    manually operable latch means on said latching subassembly lockingly engageable with a respective one of the stake sockets adjacent the rear end of a conventional pickup truck to lock said subassembly to the truck without need for tools or alterations therein.

2. A cargo bin as defined in claim 1 characterized in that said bin support and fulcrum rollers are sized to support the rear end of said bin independently of said second roller means so long as said bin is mounted on a pickup truck and said second roller means being effective to support the rear end of said bin when said bin is detached from a pickup truck.

3. A cargo bin as defined in claim 1 characterized in that said second roller means are spaced between said fulcrum rollers thereby permitting said bin and said second roller means to shift into and out of the rear end of a pickup truck without interference between said second roller means and said fulcrum rollers.

4. A cargo bin as defined in claim 1 characterized in that said latch means includes a U-shaped member slidably mounted lengthwise of the opposite ends of said latching sub-assembly and movable to a position embracing a respective stake socket at the rear end of a conventional pickup truck, and means for positively locking said U-shaped members in embracing engagement with a juxtaposed stake socket to retain said cargo bin in place crosswise of the truck cargo space.

5. A self-dumping cargo bin as defined in claim 1 characterized in the provision of tension spring means having one end fixed to the upper forward end portion thereof and the other end thereof adapted to be secured to said truck forwardly of said bin when retracted to a cargo carrying position on said truck, said spring means being operable to store sufficient energy by the rearward and downwardly tilting movement thereof when dumping its cargo to return said bin back to a horizontal position and forwardly back toward the retracted cargo carrying position thereof.

6. A self-dumping cargo bin as defined in claim 1 characterized in that the lower half portion thereof has a width less than the distance between the rear wheel wells of a conventional pickup truck, and the upper half portion of said bin extending substantially above the top edges of the cargo space sidewalls and projecting outwardly to overlie said top edge thereby substantially increasing the capacity of said bin.

7. A self-dumping cargo bin as defined in claim 1 characterized in being generally T-shaped in cross-section with the T-stem portion thereof sufficiently narrow for to and fro movement between the rear wheel wells of a pickup truck, and the T-head portion thereof projecting outwardly to overlie the upper edges of the truck cargo space thereby to increase the capacity of said bin substantially.

8. A cargo bin as defined in claim 7 characterized in the provision of rigid spacer means crosswise of the upper rear corners of said T-head portion of said bin.

9. A cargo bin as defined in claim 7 characterized in the provision of a pair of doors for closing the rear end of said bin, said doors being of inverted L-shape and having hinging connections with a respective one of the opposite ends of said T-head portion of said bin.

10. That improvement in a pickup truck having a cargo space rearward of the driver's compartment which improvement comprises:
    a self-dumping self-retracting cargo bin having a normally closed closure for the rear end thereof and provided on the opposite ends of the bottom thereof with roller means movably supporting said bin for rolling movement lengthwise of said truck cargo space and along a floor when demounted from said cargo space;
    fulcrum means readily mounted at the rear end of said truck cargo space and attachable to and detachable therefrom without need for tools and including roller means engageable with stop means near the midlength of said cargo bin on which said bin can pivot downwardly to dump the contents thereof as said bin rolls partially out of the rear end of said cargo space; and
    tension spring means having the upper end thereof fixed to the upper forward end of said bin and the lower end thereof readily detachably connected to said truck forwardly of the forward end of the bin when retracted into the truck cargo space and effective to tilt and retract the bin automatically back to the forward end of said cargo space as an incident of the final phase of dumping the contents thereof.

11. That improvement defined in claim 10 characterized in that said fulcrum means comprises a unitary subassembly extending crosswise of the interior of said cargo space and including means engageable with a wall portion of said cargo space to lock said fulcrum means detachably to said truck when in use with said bin.

12. That improvement defined in claim 10 characterized in that said fulcrum means comprises a unitary subassembly extending crosswise of said cargo space and including manually operable retainer means engageable with an interior portion of said cargo space to hold the same captively but releasably assembled to said cargo space.

* * * * *